United States Patent
Arnold

[19]

[11] Patent Number: 6,145,313
[45] Date of Patent: Nov. 14, 2000

[54] TURBOCHARGER INCORPORATING AN INTEGRAL PUMP FOR EXHAUST GAS RECIRCULATION

[75] Inventor: Steven Don Arnold, Rancho Palos Verdes, Calif.

[73] Assignee: Allied Signal Inc., Morristown, N.J.

[21] Appl. No.: 09/336,276

[22] Filed: Jun. 18, 1999

Related U.S. Application Data

[63] Continuation-in-part of application No. 09/032,101, Feb. 27, 1998, Pat. No. 5,937,650
[60] Provisional application No. 60/039,246, Mar. 3, 1997.
[51] Int. Cl.[7] .............................. F02M 25/07; F02B 37/24
[52] U.S. Cl. ............................................................ 60/605.2
[58] Field of Search .................................... 60/602, 605.2

[56] References Cited

U.S. PATENT DOCUMENTS

| | | | |
|---|---|---|---|
| 4,231,225 | 11/1980 | Aya | 60/612 |
| 4,250,711 | 2/1981 | Zehnder | 60/605.2 |
| 5,406,796 | 4/1995 | Hiereth et al. | 60/605.2 |
| 6,035,639 | 3/2000 | Kolmanovsky et al. | 60/605.2 |
| 6,050,095 | 4/2000 | Blake | 60/605.2 |

FOREIGN PATENT DOCUMENTS

| | | |
|---|---|---|
| 0620365A1 | 10/1994 | European Pat. Off. . |
| 0 740 065 A1 | 10/1996 | European Pat. Off. . |
| 4231218C1 | 9/1993 | Germany . |
| 4235794C1 | 10/1993 | Germany . |
| 5-71426 | 3/1993 | Japan . |
| WO 94/29587 | 12/1994 | WIPO . |
| WO 96/18030 | 6/1996 | WIPO . |

*Primary Examiner*—Michael Koczo
*Attorney, Agent, or Firm*—Felix L. Fischer

[57] ABSTRACT

A turbocharger with an integral Exhaust Gas Recirculation system for an internal combustion engine having a compressor rotor with two sets of vanes on opposite sides of the rotor disk for compression of charge air and recirculated exhaust gas. The charge air and recirculated exhaust gas streams are segregated in the turbocharger and an inlet and an outlet volute for the recirculated exhaust gas is integral with the turbocharger center housing. A variable geometry turbine inlet is provided for exhaust backpressure and fuel air mixture control and an integral exhaust gas bypass for recirculating EGR is controlled by an integral valve mounted with the turbine housing.

10 Claims, 7 Drawing Sheets

TURBOCHARGER INCORPORATING AN INTEGRAL PUMP FOR EXHAUST GAS RECIRCULATION

CROSS REFERENCE TO RELATED APPLICATIONS

This application is a continuation-in-part of patent application Ser. No. 09/032,101 filed on Feb. 27, 1998, now Pat. No. 5,937,650, which in turn claims the benefit of the filing date of provisional application 60/039,246 having a filing date of Mar. 3, 1997, both entitled Exhaust Gas Recirculation System Employing A Turbocharger Incorporating An Integral Pump, A Control Valve And A Mixer.

BACKGROUND OF THE INVENTION

1. Field of the Invention

The present invention is related generally to the field of internal combustion engine exhaust gas recirculation (EGR) for emissions improvement. More particularly, the invention provides a turbocharger compressor wheel having impeller vanes mounted on a side opposite the compressor impeller to act as an EGR pump with a separate diffuser and volute for EGR flow output from the pump and a separate scroll inlet to the EGR pump for recirculating exhaust gas in the charge air for the engine.

2. Description of the Related Art

EGR is a known method for reducing the NOX emissions in internal combustion engines. For effective use, an EGR system must overcome the adverse pressure gradient created by a positive pressure gradient across the engine which is typical of modern high efficiency diesel engines in at least a portion of their operating range. Various approaches to implementing EGR have included pumping of a portion of the exhaust gas from the exhaust manifold to the intake manifold. Pumping has been accomplished by introducing the exhaust gas into the compression inlet of a conventional turbocharger or supercharger present on the engine or, alternatively, providing a separate compressor receiving the exhaust gas and pressurizing it to a suitable pressure for insertion into the charge air downstream of the charge air boosting system on the engine. Some fuel consumption penalty is generally incurred by these systems.

In addition to pumping of EGR gases, control of back pressure in the exhaust system may be required to achieve desired system performance by enhancing the pumping capability and, if EGR is modulated or turned off, air fuel ratio control for the engine is desirable to maintain optimum engine performance.

The components and features of an EGR system must be accommodated within the constraints of limited volume available for allocation in modern engine compartments. It is, therefore, desirable to provide a highly integrated EGR system employing pumping components for recirculation of exhaust gas in close physical and functional cooperation with existing engine system components such as a turbocharger and providing exhaust back pressure and air fuel ratio control within the integrated system.

SUMMARY OF THE INVENTION

A turbocharger incorporating an integral pump for an EGR system for an internal combustion engine is comprised of a turbocharger having a turbine housing including an exhaust gas inlet and a turbine outlet which houses a turbine driven by exhaust gas received through the exhaust gas inlet and connected to a rotatable shaft. A center housing supporting a bearing assembly which receives the rotatable shaft, is connected to turbine housing and a compressor housing having an air inlet and a charge air outlet. A compressor rotor is attached to the rotatable shaft, the rotor having a first vane set receiving air through the compressor housing inlet and discharging compressed air to the charge air outlet. The rotor has a second vane set integrally mounted on the rotor opposite the first vane set which receives exhaust gas from an EGR inlet and discharges compressed exhaust gas through a diffuser to an exhaust gas outlet. The exhaust gas outlet and charge air outlet are separate flow paths. A baffle segregating the flow paths at the rotor circumference separates the flow paths of the exhaust gas and charge air and a sealing system enhances the flow segregation to avoid contamination of sensitive charge air cooling components with recirculated exhaust gas.

A variable geometry turbine inlet is provided in the turbocharger for exhaust back pressure and air fuel ratio control. In addition, an integral EGR activation valve is incorporated in the turbine housing for on-off control and modulation of EGR flow.

BRIEF DESCRIPTION OF THE DRAWINGS

The details and features of the present invention will be more clearly understood with respect to the detailed description and drawings in which.

DETAILED DESCRIPTION OF THE INVENTION

Figure 1:
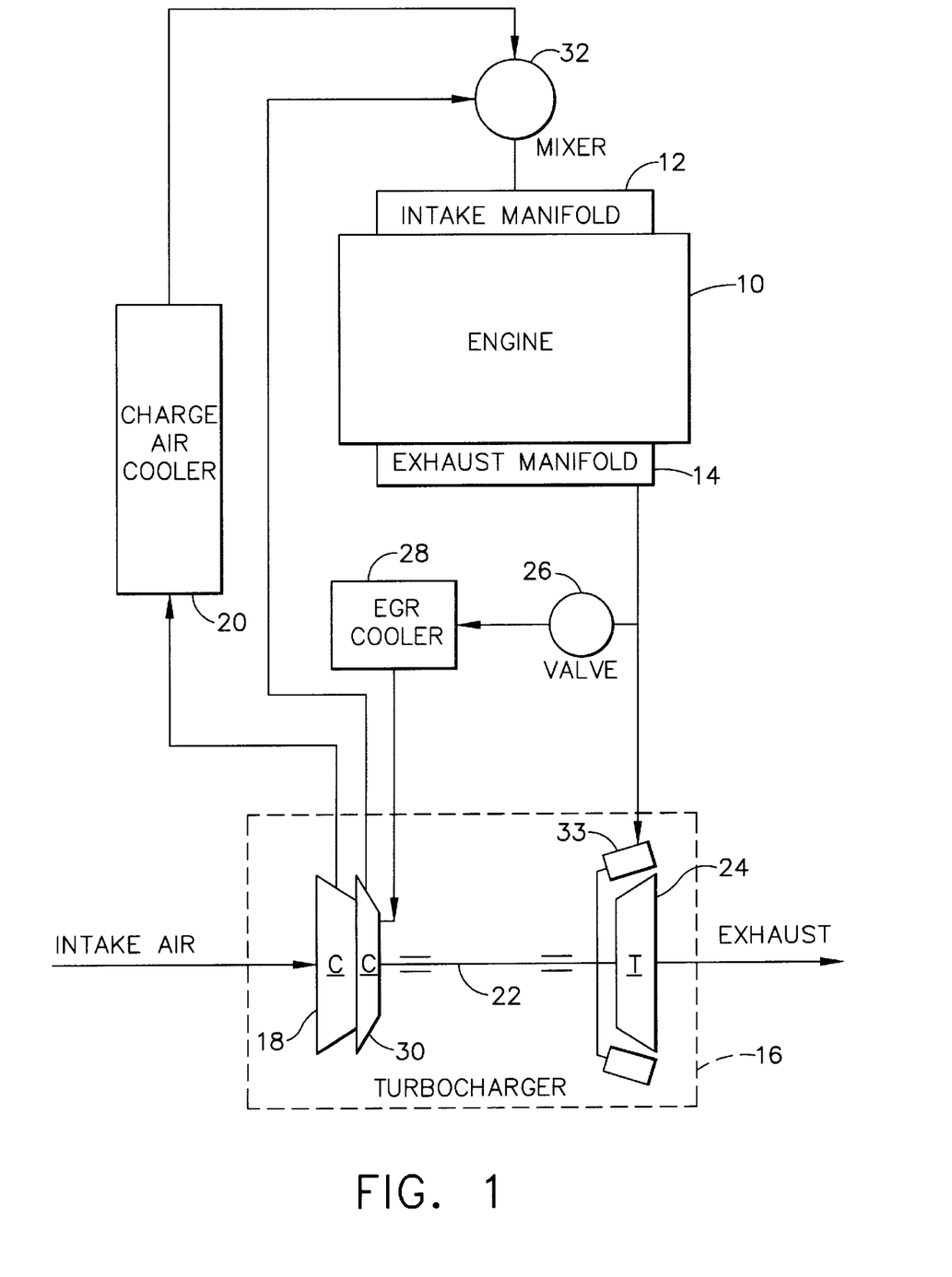
FIG. 1 is a schematic diagram of an engine and EGR system employing the a turbocharger incorporating the present invention.

Referring to the drawings, FIG. 1 shows an internal combustion engine 10 having an intake manifold 12 and an exhaust manifold 14. A turbocharger 16 is provided for charge air boost, receiving intake air for compression by a compressor rotor 18 which provides the pressurized air to a charge air cooler 20 prior to introduction into the intake manifold. The compressor rotor is driven by a shaft 22 connected to a turbine 24 receiving exhaust gas from the exhaust manifold of the engine.

Exhaust gas for recirculation is diverted from the flow out of the exhaust manifold through a control valve 26 to an EGR cooler 28. Gas from the EGR cooler is provided to the inlet of an EGR pump which, for the embodiment shown in the drawings, is a compressor rotor 30 mounted to the turbocharger shaft to be driven by the turbine. The pressurized exhaust gas from the EGR pump flows to a mixer 32 which combines the recirculated exhaust flow with the charge air to create a substantially homogenous flow stream for introduction into the intake manifold.

A variable geometry inlet 33 for the turbocharger turbine provides control of engine exhaust back pressure. Further, the variable geometry inlet allows enhanced air fuel ratio control through modulation of compressor boost pressure by varying turbine inlet area to control turbine power.

Figure 2:
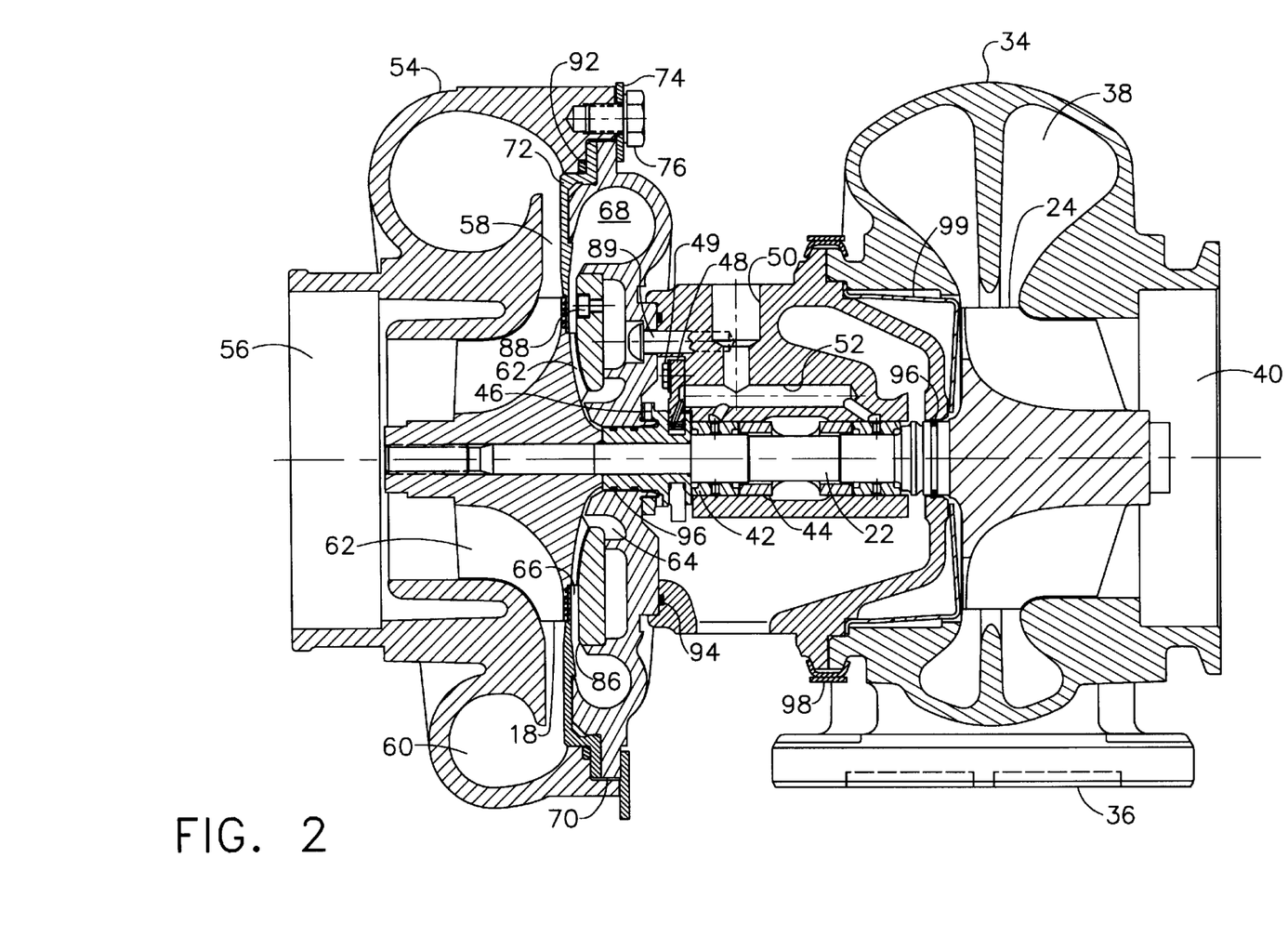
FIG. 2 is a detailed section view of an EGR pump employed in an embodiment of the invention which is integral with a turbocharger.

FIG. 2 shows the details of a turbocharger employing an integral EGR compressor according to the present invention. The turbine is contained in a cast turbine housing 34 which incorporates a radial exhaust gas inlet 36 feeding a bifurcated volute 38, for the embodiment shown in the drawings. Gas flowing through the turbine exits at turbine outlet 40. Shaft 22 is supported by a bearing system including journal bearings 42 separated by spacer 44 and thrust collar 46 with bearing 48 all carried within a center housing 50 which incorporates lubrication channels 52. The bearing 48 is attached to the center housing with bolt 49. The charge air compressor is contained within a cast compressor housing 54 which provides an air inlet 56, a diffuser 58 and a volute 60 for the compressed charge air. For the embodiment shown, a toroidal inlet is employed while in alternative embodiments, a scroll inlet is used.

The EGR pump is incorporated into the existing rotor group of the turbocharger by adding impeller vanes 62 to the back side of the compressor wheel. A scroll inlet 64 provides exhaust gas for recirculation and a separate diffuser 66 carries the pressurized exhaust gas to a volute 68. The EGR pump inlet, diffuser and volute are incorporated in a backplate casting 70 which replaces the conventional compressor back plate for the turbocharger, thereby requiring only a small increase in the length of the rotor group and turbocharger as a whole. Segregation of the charge air flow in the compressor and the recirculated exhaust gas in the EGR pump is maintained by a baffle 72 which is constrained between the compressor housing and EGR pump casting. The EGR pump casting is mounted to the compressor housing using a retaining ring 74 and bolts 76 received in the compressor housing.

Figure 3:
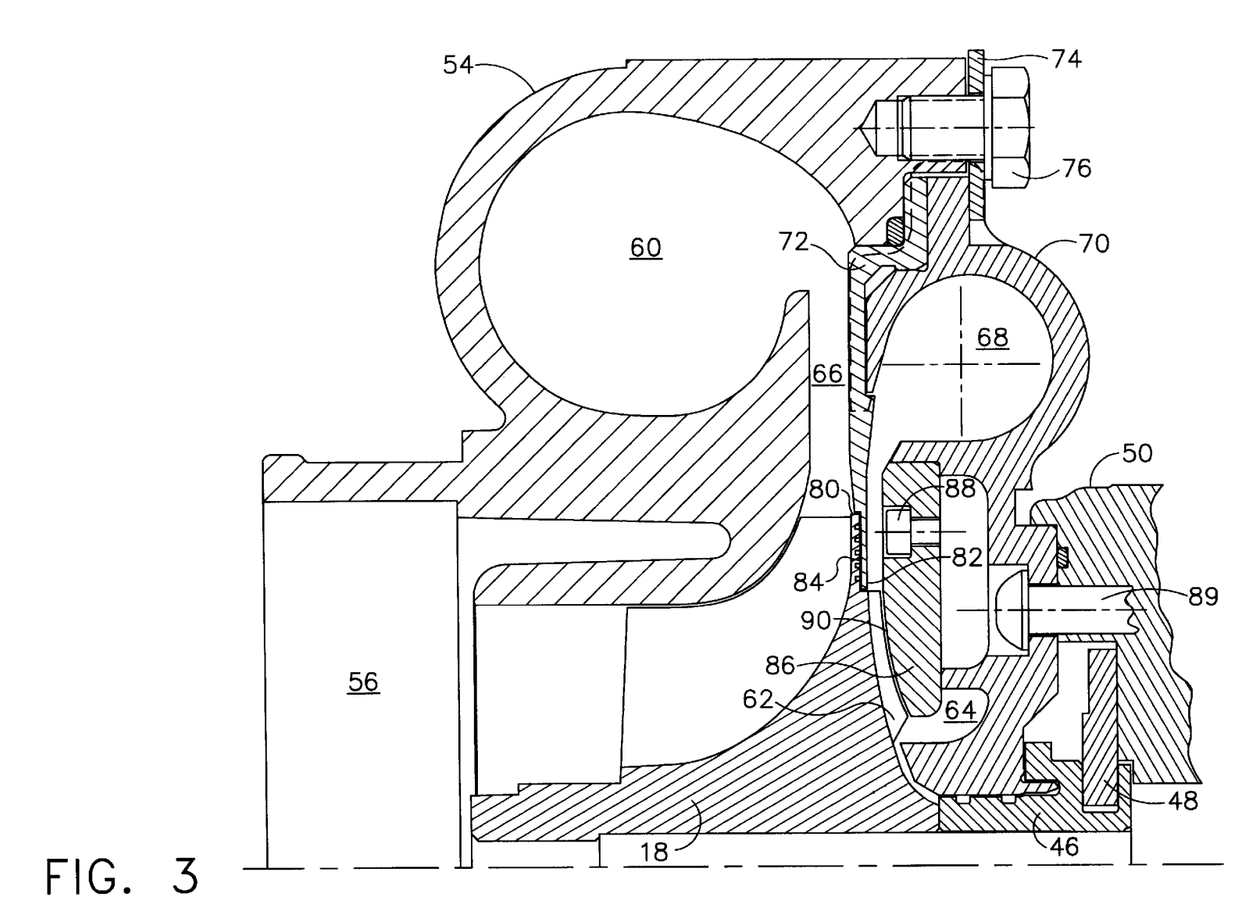
FIG. 3 is a detailed section view of the compressor and EGR pump of the turbocharger of FIG. 2.

As best seen in FIG. 3, for the embodiment shown, the baffle engages the rotor in two step seals, a first seal 80 at the circumference of the rotor and a second seal 82 on the EGR pump side of the rotor, inset from the circumference adjacent the leading edge of the pump impeller vanes. A scroll seal 84 is also employed in the embodiment shown in the drawings, to create a pressure differential further enhancing the separation of the EGR flow and charge air flow in the turbocharger to avoid fouling of the charge air flow components such as the charge air cooler downstream of the turbocharger.

A cover 86 is attached to the EGR pump casting with machine screws 88. The cover extends, in the embodiment shown, from the EGR inlet to the EGR volute and provides a second surface for cooperation with the inner surface of the baffle to form the EGR pump impeller diffuser. The cover further overlays the attachment bolts 89, which secure the pump casting to the center housing 50, for improved aerodynamics. The cover is machined on surface 90 to provide the proper trim for the EGR pump impeller blades allowing flexibility for common use of the EGR pump casting with various engine EGR pumping requirements.

As seen in FIGS. 2 and 3, resilient seals 92 and 94 provide additional sealing of the compressor housing to the baffle/EGR pump casting and the EGR pump casting to the center housing, respectively. Piston seals 96 provide sealing of the rotating shaft adjacent the compressor and turbine. For the embodiment shown in FIG. 2, the turbine housing is attached to the center housing using a V-band 98 and a heat shield 99 is supported between the center housing and turbine housing.

Figure 4A:
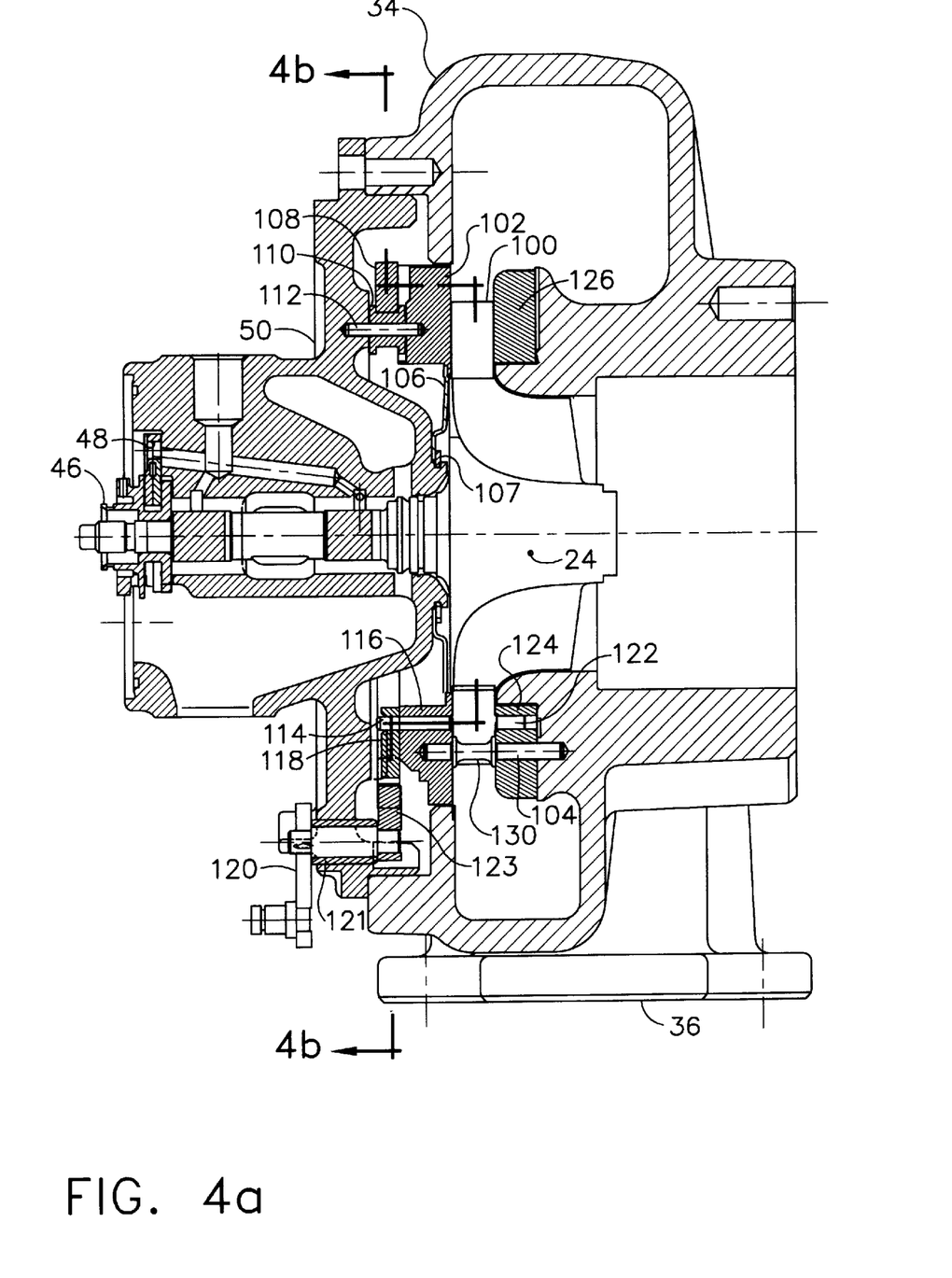
FIG. 4a is a detailed section view of a variable geometry turbine inlet system for use in a turbocharger employing the present invention.
Figure 4B:
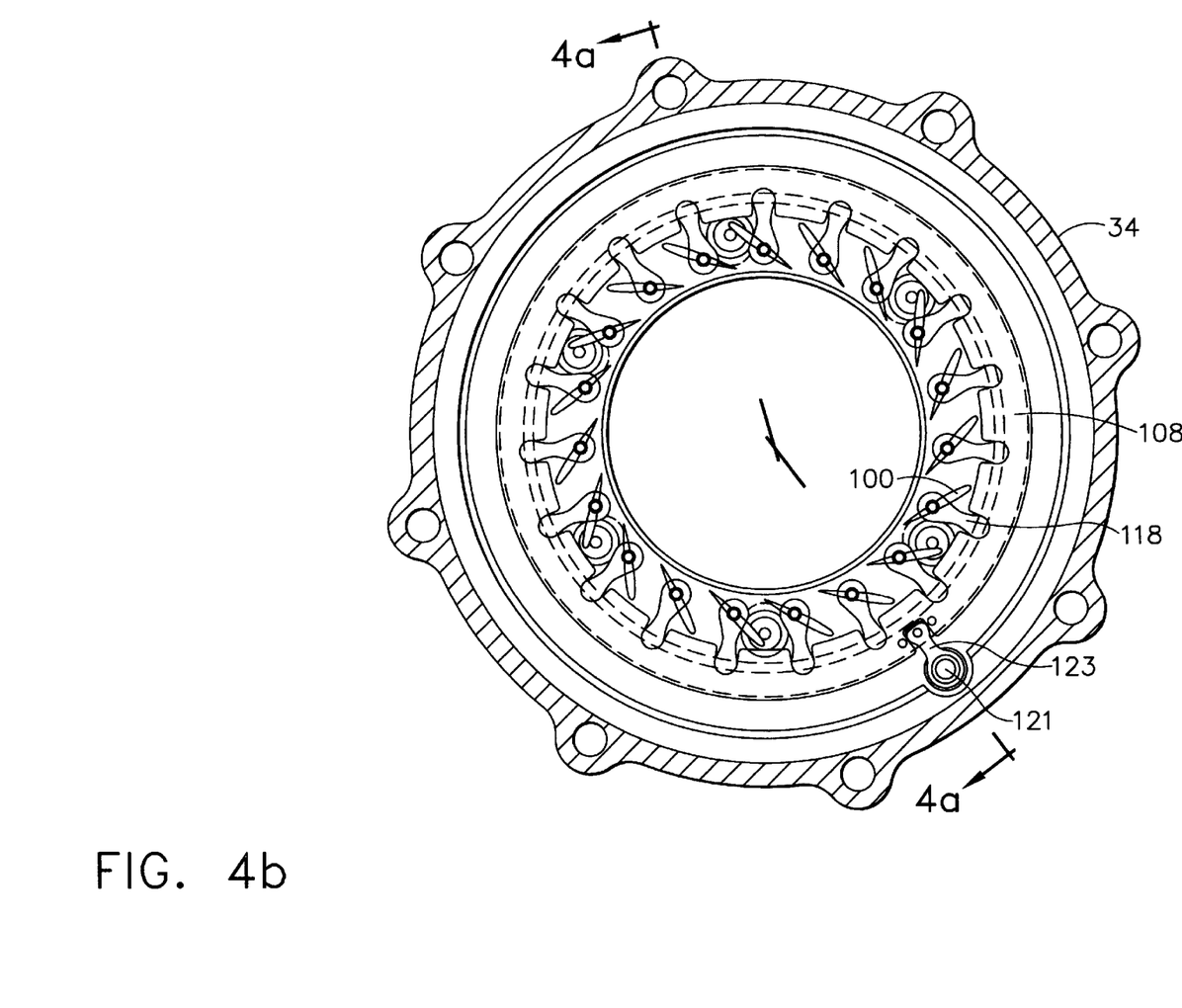
FIG. 4b is a section view of the variable geometry turbine inlet system of FIG. 4a along section line 4b—4b.

FIGS. 4a and 4b show a center housing and turbine housing arrangement employing a variable geometry turbine inlet for use in the present invention. A multiple rotating vane configuration, comparable to that disclosed in U.S. Pat. No. 5,947,681 entitled Pressure Balanced Dual Axle Variable Nozzle Turbocharger and having a common assignee with the present application, is provided for the embodiment shown in the drawings. The vanes 100 of the variable geometry nozzle 33 are supported by axles extending into nozzle ring 102 which, in the embodiment shown, is supported in spaced relation to the turbine housing 34 by a plurality of spacer pins 104 and fixed by a disk spring 106 secured by a retaining ring 107. A unison ring 108 rotatably mounted on rollers 110 supported by dowel pins 112, provides the actuation for the multiple vanes. Rotation of the unison ring rotates the vanes through a range of motion from a first substantially open position providing maximum nozzle entrance area and flow to a second substantially closed position providing minimum nozzle entrance area. Each of the vanes is partially supported by a first axle 114 which extends in close relation into and is rotatably supported by apertures 116 in the nozzle ring. The first axle extends through the nozzle ring and is attached to a vane arm 118 which is received in slots in the unison ring for actuation of the vanes. Rotation of the unison ring is accomplished by an external crank 120 and an actuator linkage including rod 121 and crank arm 123.

A second axle 122 extends from each of the vanes, opposite and co-axial with the first axle. The second axle extends in close relation into and is rotatably supported by mating apertures 124 in an insert ring 126 which is recessed into the turbine housing and carried by a machined relief 128. The nozzle ring and insert ring form the bounding hub and shroud surfaces of the nozzle. Three precision hollow, circular spacers 130, surrounding the spacer pins 104, are used to precisely locate and space the two rings and to secure the nozzle ring assembly to the turbine housing between the nozzle inlet and the nozzle outlet adjacent the turbine.

Figure 5:
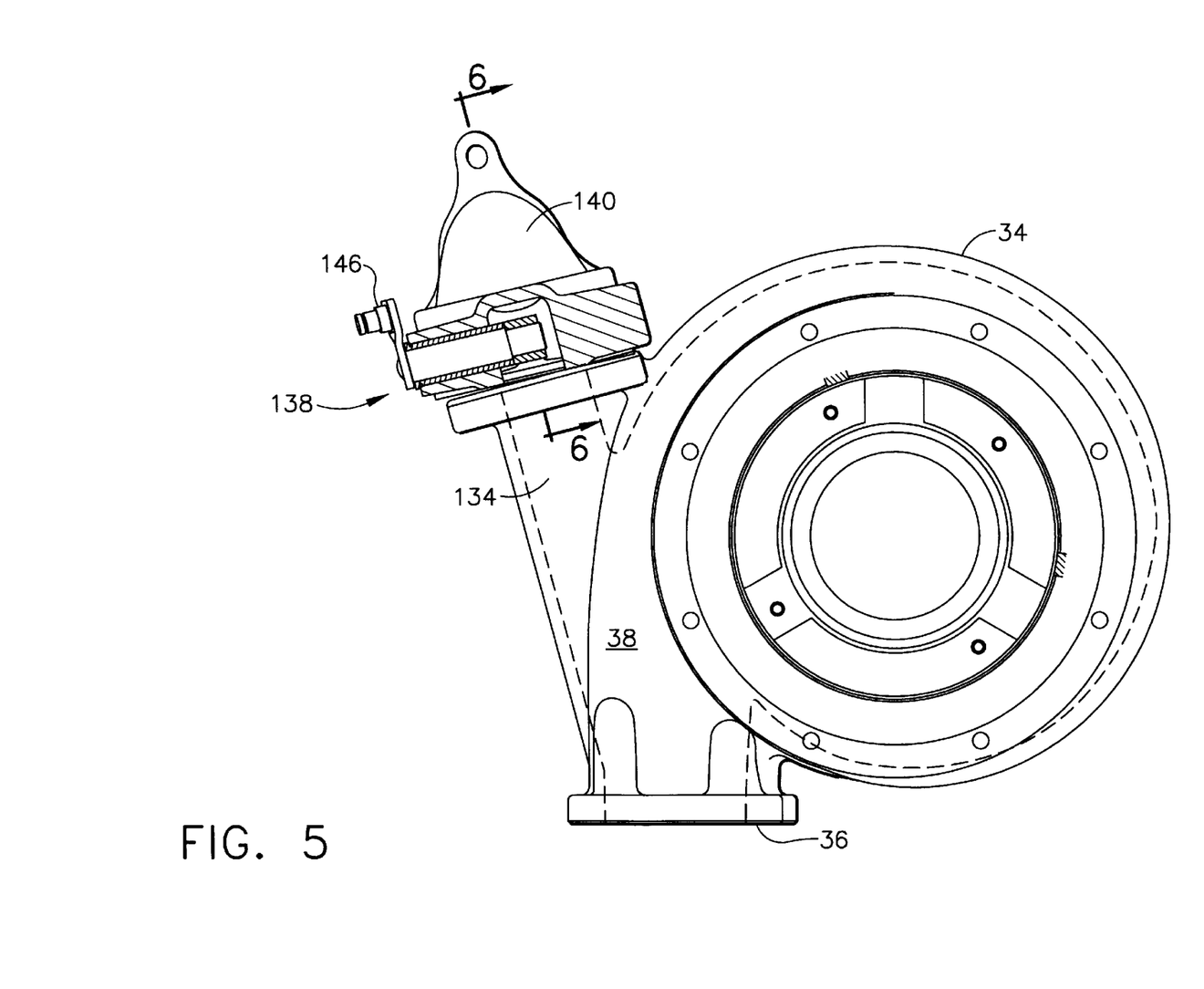
FIG. 5 is a view along section line 5—5 in FIG. 6 of a turbine housing for the variable geometry turbine including an integral exhaust recirculation port.
Figure 6:
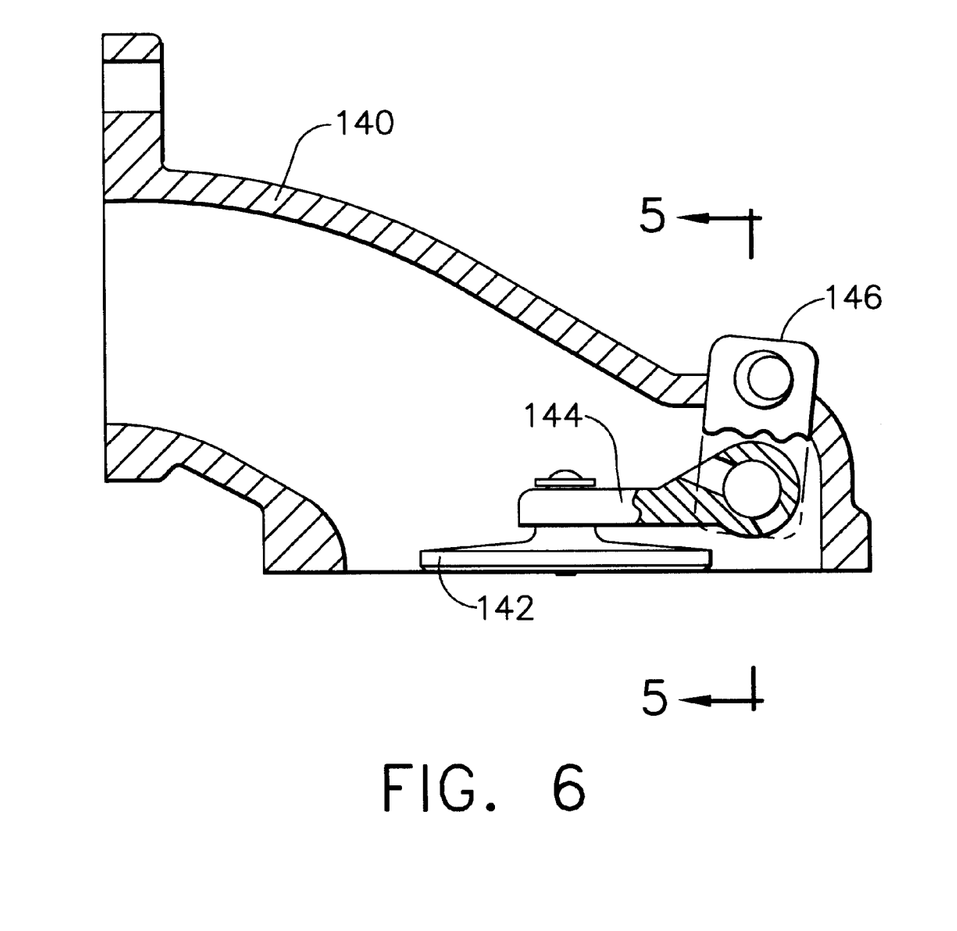
FIG. 6 is a view along section line 6—6 in FIG. 5.

Exhaust gas from the engine is received by the turbocharger through radial inlet 36 into the volute 38. As seen in FIG. 5, a bypass 134 is provided from the volute. An EGR valve 138, also shown in FIG. 6, controls EGR flow from the turbine housing inlet through an exhaust elbow 140. The EGR valve includes a poppet 142 rotatable by arm 144 from a seated position closing the bypass to an open position by crank 146. Valve 26 of FIG. 1, in certain embodiments, comprises only the on-off EGR valve as shown while in alternative embodiments may include a second proportional valve such as that disclosed in U.S. Pat. No. 5,937,650 to further control EGR flow. An alternative embodiment of the invention employs an Eaton model 102790 proportional valve for EGR flow control.

As disclosed in U.S. Pat. No. 5,937,650, a conduit connection from the recirculated exhaust elbow through an EGR cooler is employed or in alternative embodiments, runs directly to the exhaust gas inlet in the EGR pump casting of the turbocharger.

Having now described the invention in detail as required by the patent statutes, those skilled in the art will recognize modifications and substitutions to the specific embodiments disclosed herein. Such modifications and substitutions are within the scope and intent of the present invention as defined in the following claims.

What is claimed is:

1. A turbocharger incorporating an integral Exhaust Gas Recirculation (EGR) pump comprising:
   a turbine housing including an exhaust gas inlet and an exhaust gas outlet;
   a turbine driven by exhaust gas received through the exhaust gas inlet and connected to a rotatable shaft;
   a center housing supporting a bearing assembly which receives the rotatable shaft, the center housing including means for connection to the turbine housing;
   a compressor housing having an air inlet and a charge air outlet;
   a compressor rotor attached to the rotatable shaft, the rotor having a first vane set receiving air through the compressor housing inlet and discharging compressed air to the charge air outlet, the rotor having a second vane set integrally mounted on the rotor opposite the first vane set and receiving exhaust gas from an EGR inlet and discharging compressed exhaust gas through a diffuser to an EGR outlet, the EGR outlet and charge air outlet comprising separate flow paths;
   a baffle for segregating the flow paths at the rotor circumference to separate the flow paths of the exhaust gas and charge air, said baffle having at least one step seal adapted for cooperative interaction with the compressor rotor;
   means for attaching the EGR outlet to a mixer; and
   means for attaching the charge air outlet to the mixer.

2. A turbocharger as defined in claim 1 wherein the EGR inlet and EGR outlet are incorporated as a casting mounted intermediate the compressor housing and the turbine housing, the casting incorporating a backplate for the compressor rotor and further including:
   means for mounting the casting to the center housing;
   means for mounting the compressor housing to the casting; and
   means for interfacing with the second vane set at a predetermined trim.

3. A turbocharger as defined in claim 2 wherein the means for interfacing with the second vane set at a predetermined trim comprises:
   a substantially cylindrical cover having an outer circumference proximate the EGR outlet and an inner circumference proximate the EGR inlet having a first surface distal the compressor rotor engaging the casting and a second surface proximate the second vanes on the rotor, the second surface machined to match the vane trim; and,
   means for attaching the cover to the casting.

4. A turbocharger as defined in claim 3 wherein an inner surface of the baffle outboard of the second vanes is a first surface of a diffuser and the second surface of the cover further includes an outboard portion oriented in spaced relation to the diffuser first surface as a diffuser second surface.

5. A turbocharger as defined in claim 3 wherein the means for attaching the cover comprises a plurality of bolts recessed into the diffuser second surface and extending into the casting.

6. A turbocharger as defined in claim 5 wherein the means for mounting the casting to the center housing comprises a plurality of center housing bolts and the cover extends over the center housing bolts.

7. A turbocharger as defined in claim 3 wherein the EGR outlet comprises a volute.

8. A turbocharger as defined in claim 3 wherein the EGR inlet comprises a toroid.

9. A turbocharger incorporating a integral Exhaust Gas Recirculation (EGR) pump comprising:
   a turbine housing including an exhaust gas inlet and a turbine outlet;
   a variable geometry nozzle integral to the turbine housing receiving exhaust gas from the exhaust gas inlet, said variable nozzle adjustable to control exhaust gas backpressure;
   a turbine driven by exhaust gas received through the variable geometry nozzle and connected to a rotatable shaft;
   a center housing, supporting a bearing assembly which receives the rotatable shaft, the center housing including means for connection to the turbine housing;
   a compressor housing having an air inlet and a charge air outlet;
   a compressor rotor attached to the rotatable shaft, the rotor having a first vane set receiving air through the compressor housing inlet and discharging compressed air to the charge air outlet, the rotor having a second vane set integrally mounted on the rotor opposite the first vane set and receiving exhaust gas from an EGR inlet and discharging compressed exhaust gas through a diffuser to a recirculated exhaust gas outlet, the recirculated exhaust gas outlet and charge air outlet comprising separate flow paths;
   means for segregating the flow paths at the rotor circumference to separate the flow paths of the recirculated exhaust gas and charge air;
   means for attaching the recirculated exhaust gas outlet to a mixer; and
   means for attaching the charge air outlet to the mixer.

10. A turbocharger as defined in claim 9 further comprising:
    a turbine exhaust gas bypass integral to the turbine housing for exhaust gas to be recirculated;
    and a valve adapted to seal the bypass.

* * * * *